United States Patent
Hew et al.

(10) Patent No.: US 9,576,095 B1
(45) Date of Patent: Feb. 21, 2017

(54) PARTIAL RECONFIGURATION COMPATIBILITY DETECTION IN AN INTEGRATED CIRCUIT DEVICE

(71) Applicant: Altera Corporation, San Jose, CA (US)

(72) Inventors: Yin Chong Hew, Selama (MY); Paul Mark Leventis, Toronto (CA)

(73) Assignee: Altera Corporation, San Jose, CA (US)

( * ) Notice: Subject to any disclaimer, the term of this patent is extended or adjusted under 35 U.S.C. 154(b) by 259 days.

(21) Appl. No.: 14/447,279

(22) Filed: Jul. 30, 2014

(51) Int. Cl.
*G06F 17/50* (2006.01)
*H03K 19/173* (2006.01)

(52) U.S. Cl.
CPC ......... *G06F 17/5068* (2013.01); *H03K 19/173* (2013.01)

(58) Field of Classification Search
CPC ................................ H01L 21/02; G06F 17/50
USPC .................... 716/100, 101, 104; 708/190
See application file for complete search history.

(56) References Cited

U.S. PATENT DOCUMENTS

| | | | |
|---|---|---|---|
| 6,046,603 A | 4/2000 | New | |
| 6,907,595 B2 | 6/2005 | Curd et al. | |
| 7,853,916 B1 * | 12/2010 | Trimberger | H03K 17/693 716/134 |
| 7,971,173 B1 | 6/2011 | Brashears et al. | |
| 8,415,974 B1 * | 4/2013 | Lysaght | H03K 19/17752 326/39 |
| 8,997,033 B1 * | 3/2015 | Hew | G06F 17/5054 716/116 |
| 2007/0288765 A1 * | 12/2007 | Kean | G06F 21/76 713/193 |
| 2013/0162290 A1 | 6/2013 | Margabandu et al. | |
| 2014/0196134 A1 * | 7/2014 | Yamaguchi | G06F 21/44 726/7 |

* cited by examiner

*Primary Examiner* — Minh D A

(57) ABSTRACT

Methods for partial reconfiguration compatibility detection in an integrated circuit device are disclosed. A disclosed method includes storing a unique identifier that identifies a partial reconfiguration region of the integrated circuit device in a storage circuit. A control circuit may receive an input partial reconfiguration data that activates the operations of the partial reconfiguration region. The method further includes comparing the input partial reconfiguration data to the stored unique identifier prior to activating the operations of the partial reconfiguration region of the integrated circuit device. The input partial reconfiguration data may contain an associated identifier that is derived from the unique identifier during a design compilation operation of the integrated circuit device.

20 Claims, 7 Drawing Sheets

PARTIAL RECONFIGURATION COMPATIBILITY DETECTION IN AN INTEGRATED CIRCUIT DEVICE

BACKGROUND

A programmable integrated circuit has programmable elements that are loaded with full configuration data. The full configuration data in the programmable elements is used to configure or reconfigure programmable logic on the circuit to store data or perform a custom logic function. Partial reconfiguration (PR) enables a user to define and constraint different PR regions in an integrated circuit device during design creation and to reconfigure the different PR regions during user mode. When a PR region is defined in a user design, PR bit streams (or PR data) are generated along with the full configuration data. The generated PR bit streams may then be used to reconfigure the defined PR regions during user mode. Regions that are non-reconfigurable in user mode (also referred collectively as a static region) are configured during device configuration before entering user mode (i.e., before the device enters normal operational mode).

However, the flexibility and ease of reconfiguring a PR region may be error prone as the user may accidentally reconfigure a PR region with incompatible PR data (e.g., PR bit streams). For example, when a user design is updated and recompiled, new full configuration data may be generated to replace the previous full configuration data. If the updated user design includes a modified PR region, a new set of PR data may also be generated along with the new full configuration data. When PR data from a previous compilation of the user design is mistakenly used to reconfigure the PR region in the integrated circuit device (which has since been updated with the new full configuration data), the existing user design on the integrated circuit device may be corrupted and may damage the integrated circuit device.

SUMMARY

In accordance with embodiments of the present invention, methods and apparatus are provided for detecting compatibility of partial reconfiguration regions in an integrated circuit device.

It is appreciated that the present invention can be implemented in numerous ways such as a process, an apparatus, a system, a device, or a method on a computer readable medium. Several inventive embodiments of the present invention are described below.

A method for using computer equipment to configure an integrated circuit is disclosed. The method includes receiving custom logic design data for the integrated circuit using the computer equipment. When a partial reconfiguration region is defined in the custom logic design data, an identifier is assigned for the partial reconfiguration region. Subsequently, full configuration data is generated for a static region of the integrated circuit device based on the custom logic design data. The full configuration data includes the identifier. Additionally, partial reconfiguration data that includes the identifier is generated for the partial reconfiguration region. In the case of a change in the custom logic design data associated with the partial reconfiguration region, an additional identifier is assigned for the partial reconfiguration region as a replacement identifier. The additional identifier will be included in the new full configuration data and the new partial reconfiguration data.

A method for configuring an integrated circuit device is provided. The method includes receiving input partial reconfiguration data that includes an associated identifier. The input partial reconfiguration is then determined whether it is compatible with a partial reconfiguration region of the integrated circuit device based at least on the associated identifier. Prior to receiving the input partial reconfiguration data, full configuration data is received. The full configuration data includes a unique identifier that identifies a partial reconfiguration region of the integrated circuit device. The method further includes comparing the associated identifier to the stored unique identifier using a comparator circuit. Once a match is found, the input partial reconfiguration data will be used to reconfigure the integrated circuit device to perform partial reconfiguration operations.

An integrated circuit is disclosed. The integrated circuit includes a storage circuit having a register that stores a unique identifier. The unique identifier identifies a partial reconfiguration region of the integrated circuit. The integrated circuit further includes a control circuit that is configured to receive input partial reconfiguration data having an associated identifier for the partial reconfiguration region and a comparator circuit that determines whether the input partial reconfiguration data is compatible with the partial reconfiguration region of the integrated circuit. The comparator circuit compares an associated identifier to the stored unique identifier in the storage circuit. The comparator circuit then produces a comparator output during partial reconfiguration operations that identifies whether the input partial reconfiguration data is compatible with the partial reconfiguration region integrated circuit.

Further features of the invention, its nature and various advantages, will be more apparent from the accompanying drawings and the following detailed description of the preferred embodiments.

DETAILED DESCRIPTION

The embodiments provided herein include circuitry and techniques for detecting compatibility of partial reconfiguration regions in an integrated circuit device.

It will be obvious to one skilled in the art that the present exemplary embodiments may be practiced without some or all of these specific details. In other instances, well-known operations have not been described in detail in order not to unnecessarily obscure the present embodiments.

Figure 1A:
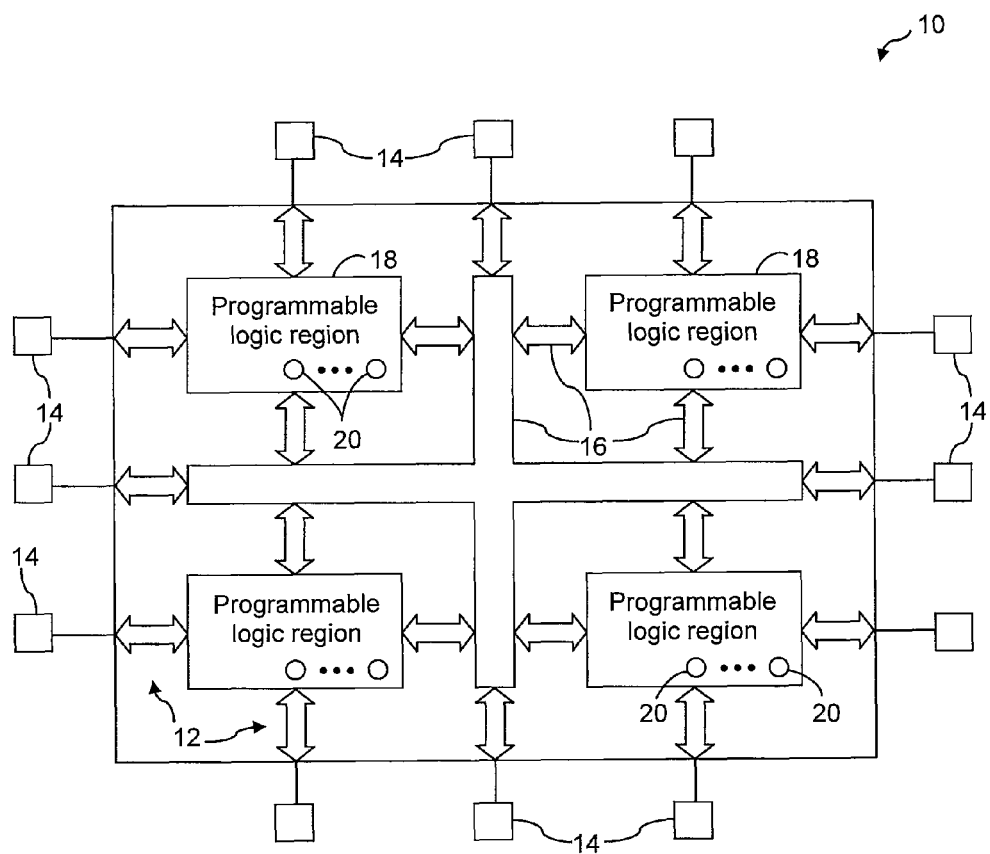
FIG. 1A is a diagram of an illustrative integrated circuit in accordance with an embodiment of the present invention.

FIG. 1A is a diagram of an illustrative integrated circuit 10, in accordance with an embodiment of the present invention. Integrated circuit 10 may have input/output circuitry 12 for driving signals off of integrated circuit 10 and for receiving signals from other circuits or devices via input/output pins 14.

Interconnection resources 16 such as global and local vertical and horizontal conductive lines and busses may be used to route signals on integrated circuit 10. Interconnection resources 16 include fixed interconnects (conductive lines) and programmable interconnects (e.g., programmable connections between respective fixed interconnects). The programmable interconnects associated with interconnection resources 16 may be considered to be a part of programmable logic regions 18.

Memory elements 20 may be formed using complementary metal-oxide-semiconductor (CMOS) integrated circuit technology (as an example). In the context of programmable logic device, the memory elements may store configuration data and are therefore sometimes referred to as configuration random-access memory (CRAM) cells. In general, configuration random-access memory elements 20 may be arranged in an array pattern. In a programmable logic device, there may be millions of memory elements 20 on a single device. A user (e.g., a logic designer) may provide configuration data for the array of memory elements during programming operation. Once loaded with configuration data, memory elements 20 may selectively control (e.g., turn on and off) portions of the circuitry in programmable logic regions 18 and thereby customize its functions as desired.

The circuitry of programmable logic device 10 may be organized using any suitable architecture. For example, programmable logic regions 18 may be organized in a series of rows and columns of larger programmable logic regions each of which contains multiple smaller regions. The larger regions are sometimes referred to as logic array blocks. The smaller logic regions are sometimes referred to as logic elements. A typical logic element may contain a look-up table, registers, and programmable multiplexers. If desired, programmable logic regions 18 may be arranged in more levels or layers in which multiple large regions are interconnected to form still larger portions of logic.

Horizontal and vertical conductors and associated control circuitry may be used to access memory elements 20 when memory elements 20 are arranged in an array. The control circuitry, for example, may be used to clear all or some of the memory elements. The control circuitry may also write data to memory elements 20 and may read data from memory elements 20. Memory elements 20 may be loaded with configuration data, for instance, in CRAM arrays. The loaded configuration data may then be read out from the memory array to confirm proper data capture before integrated circuit 10 is used during normal operation in a system.

Integrated circuit 10 may also include partial reconfiguration regions or circuitry that allow a user to define groups of logic elements to be reconfigurable during normal operation of the device without affecting other parts of the device. Typically, when designing a circuit, the user may define specific parts or areas of the integrated circuit as partial reconfiguration regions. The partial reconfiguration regions, or more specifically, circuitry within these regions, may accordingly be reconfigured during user mode (i.e., when the device is up and running) without affecting circuitry in other parts (e.g., non-reconfigurable regions) of the integrated circuitry. However, the flexibility and ease of reconfiguring the partial reconfiguration regions during user mode may not be fail-safe as the user may accidentally reconfigure a partial reconfiguration region with incompatible partial reconfiguration data (e.g., partial reconfiguration bit streams).

Therefore, an error checking mechanism may be required to ensure the user does not inadvertently reconfigure a partial reconfiguration region in the integrated circuit with incompatible partial reconfiguration data that may corrupt the existing design in the integrated circuit device. The error checking mechanism may generate and assign a unique identifier for the partial reconfiguration region whenever a custom logic design data is compiled, or recompiled (due to design modification). The unique identifier may indicate the compatibility of the partial reconfiguration region with a compiled output data (e.g., full configuration data) of the custom logic design data, and may be stored in a storage circuit during the configuration of the integrated circuit device. Once the integrated circuit device is configured, the error checking mechanism, which will be described in detail below, is put in place to ensure that the supplied partial reconfiguration data has an associated identifier that matches the stored unique identifier. If both identifiers match, the partial reconfiguration region may then be reconfigured with the supplied partial reconfiguration data.

Figure 1B:
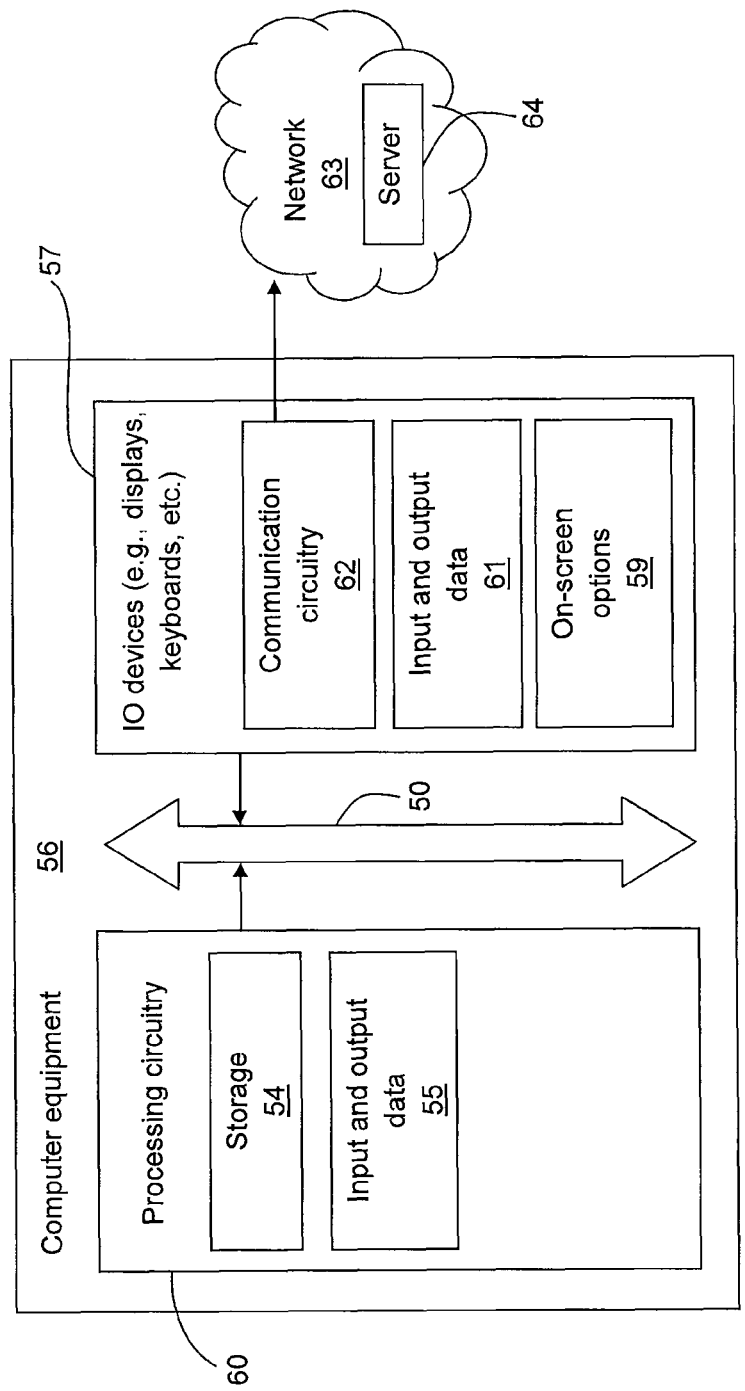
FIG. 1B is a block diagram of an illustrative computer equipment that may be used to implement computer-based software tools in accordance with an embodiment of the present invention.

In a typical design flow, a circuit designer would use electronic design automation (EDA) tool to create a circuit design, and the EDA tool would generate configuration data (e.g., configuration bit streams) that can then be used to configure an integrated circuit. FIG. 1B is an illustrative computer equipment that can be used for this purpose. As shown in FIG. 1B, computer equipment 56 may include processing circuitry 60. Computer equipment 56 may be based on one or more processors such as personal computers, workstations, etc. Processing circuitry 60 may include circuitry for performing various supported instructions. Storage 54 in processing circuitry 60 may be organized to form shared and stand-alone databases. The stored information in the storage 54 may include input and output data 55. For example, input data may include settings selected by a user or a software library. Output data may include modeling results, configuration data, reports and any other suitable processed output from computer equipment 56.

In supporting design operations involved in implementing a desired custom logic function, computer equipment 56 may use software that runs on processing circuitry 60. This software may take the form of one or more programs. For example, the software is an EDA tool. When the programs are running on computer equipment 56, computer equipment 56 is sometimes referred to as a computer-aided design tool (or tools).

Input and output devices 57 may include input devices such as pointing devices and keyboards and may include output devices such as printers and displays. As shown in FIG. 1B, computer equipment 56 may display on-screen options 59 on a display. The user may click on these on-screen options or may otherwise make selections based on the displayed information. The user may also provide input by typing into text boxes, by performing drag and drop operations, using tabs, etc. Input and output data 61 may include input data (e.g., data that a user has typed into a text-box or has selected using a drop-down menu or other selectable options) and output data (e.g., modeling results, reports, information indicative of design choices, etc.). Input and output data 61 may be displayed on a display or printed for a user.

Communication circuitry 62 may facilitate data and information exchange between various circuits of computer equipment 56 through bus interface circuitry 50. As an example, communication circuitry 62 may provide various protocol functionality (e.g., Transmission Control Protocol/Internet Protocol (TCP/IP) (including the physical layer, or PHY), User Datagram Protocol (UDP) etc.), as desired. As another example, communication circuitry 62 may communicate with network 63 (e.g., Ethernet, token ring, etc.). Network 63 may include one or more servers 64 that store data and information. During integrated circuit testing, communication circuitry 62 may be configured to store performance results of each tested integrated circuit on server 64. If desired, communication circuitry 62 may be used to send and receive data such as the performance results from server 64 over network 63.

Figure 2:
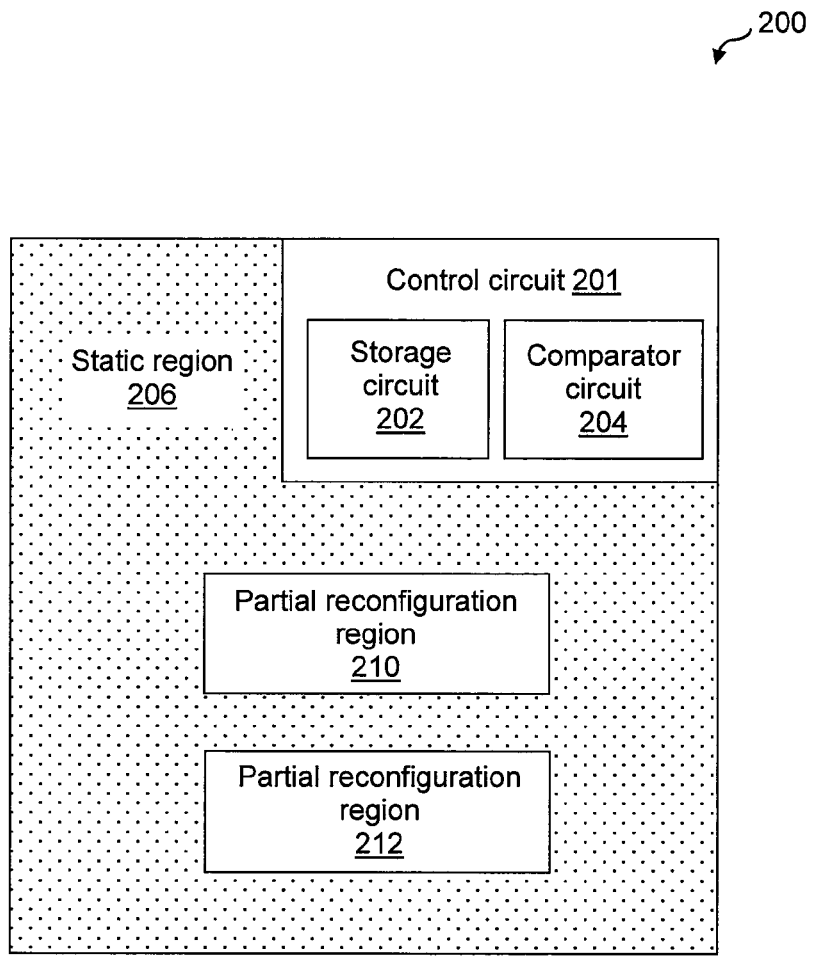
FIG. 2 is an illustrative integrated circuit device in accordance with an embodiment of the present invention.

FIG. 2 is an illustrative integrated circuit device 200 in accordance with an embodiment of the present invention. Integrated circuit device 200 includes control circuit 201, static region 206, and partial reconfiguration regions 210 and 212. Static region 206 is a fixed region outside of partial reconfiguration regions 210 and 211 and may only be configured during device configuration (i.e., before the device is up and running). Conversely, partial reconfiguration regions 210 and 212 (also referred to as partial reconfiguration partitions) are regions on integrated circuit device 200 that may be reconfigured while the device is running.

As shown in FIG. 2, control circuit 201 may include storage circuit 202 and comparator circuit 204. In one embodiment, control circuit 201, storage circuit 202 and comparator circuit 204 may be hard intellectual property (IP) blocks (e.g., the logic of the IP blocks may be hardwired during manufacturing). In general, a semiconductor intellectual property (IP) core, or simply "IP core" or "IP block," may refer to a unit of logic, a cell, a chip layout, or otherwise to a circuit design to be used in conjunction with other circuits as part of a larger integrated circuit design. IP blocks are defined through circuitry of integrated circuit device 200. Each circuit design is utilized to perform a specific logic function for a particular IP block. In one embodiment, control circuit 201, storage circuit 202 and comparator circuit 204 may be hard (IP) blocks, which may be hardwired into integrated circuit device 200 during manufacturing.

During a design and implementation phase, a user may define partial reconfiguration regions 210 and 212 to perform specific operations and implement them in a user design (e.g., custom logic design data). A unique identifier is then generated and assigned to each partial reconfiguration region, respectively. In one suitable arrangement, the unique identifier may be generated by a random number generator or any other suitable mechanism. As an alternative example, the unique identifier may be obtained by performing a hash function on the partial reconfiguration data.

In one embodiment, the user design is compiled using an electronic design automation (EDA) tool to generate full configuration data. The full configuration data may be used to configure integrated circuit device 200. In one embodiment, the full configuration data may include the generated unique identifiers, which may be stored in storage circuit 202 during the configuration of integrated circuit device 200. For example, storage circuit 202 may be a register or a cache memory in integrated circuit device 200. It should be appreciated that even though an internal storage element (e.g., storage circuit 202) is shown in the embodiment of FIG. 2, an external storage element may be used to store the unique identifier. For example, integrated circuit 200 may be coupled to an external memory module that stores the unique identifiers. Alternatively, when used in a larger system, the external storage element may include hard disk drives, database servers, flash devices, etc.

In one embodiment, the user design, including the defined partial reconfiguration regions, may need to be recompiled whenever a modification is made to the user design. For example, a user may modify the implementation of a particular partial reconfiguration region (e.g., partial reconfiguration region 212) in the user design. In this scenario, a new unique identifier may be generated to replace the unique identifier that was initially assigned to the partial reconfiguration region during a previous compilation of the user design. The entire user design may be recompiled to generate a new full configuration data that includes the new unique identifier. Accordingly, new partial reconfiguration data that includes the new unique identifier is also generated for the modified partial reconfiguration region during design recompilation. During device configuration, the new full configuration data may be used to configure integrated circuit device 200 again. The new unique identifier that is included in the new full configuration data will be stored in storage circuit 202. In one embodiment, the new unique identifier replaces (e.g., overwrites) the unique identifier from the previous compilation of the user design in storage circuit 202.

When integrated circuit device 200 is operating normally (e.g., operating in user mode), control circuit 201 may receive partial reconfiguration data that may be used to reconfigure either one of partial reconfiguration regions 210 and 212. The partial reconfiguration data may include an associated identifier that may correspond to a specific partial reconfiguration region (e.g., partial reconfiguration region 210) in integrated circuit device 200. In one embodiment, the associated identifier may be derived from one of the unique identifiers mentioned above.

As an example, assuming that the received partial reconfiguration data is meant to reconfigure partial reconfiguration region 210 in integrated circuit device 200, comparator circuit 204 may perform a compatibility check on the received partial reconfiguration data to determine whether it is compatible with partial reconfiguration region 210. During the compatibility check of the partial reconfiguration data, comparator circuit 204 may compare the associated identifier of the received partial reconfiguration data with the unique identifier(s) stored in storage circuit 202. Comparator circuit 204 may be made up of one or more electronic components that collectively provide a function for comparing two unique identifiers. When the associated identifier matches the unique identifier belonging to partial reconfiguration region 210, comparator circuit 204 may produce a comparator output. The comparator output may identify the compatibility between the input partial reconfiguration data and the partial reconfiguration region in integrated circuit device 200 and allow control circuit 201 to configure integrated circuit device 200 to perform the partial reconfiguration operation.

Figure 3:
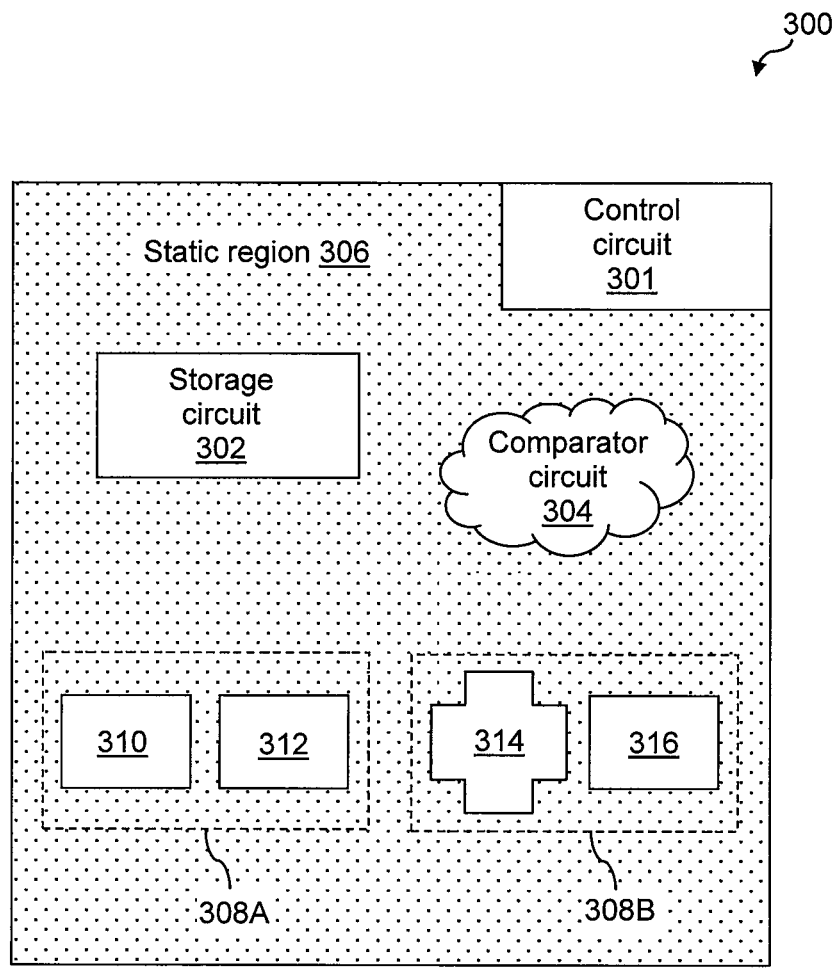
FIG. 3 is an illustrative integrated circuit device having grouped partial reconfiguration regions in accordance with an embodiment of the present invention.

In the case when multiple partial reconfiguration regions are defined in an integrated circuit device, the partial reconfiguration regions may be grouped together and share a single group identifier. FIG. 3 is an illustrative integrated circuit device 300 having grouped partial reconfiguration regions in accordance with an embodiment of the present invention. As shown in FIG. 3, integrated circuit device 300 may include control circuit 301, storage circuit 302 and comparator circuit 304. In one embodiment, control circuit 301, storage circuit 302, and comparator circuit 304 may be soft intellectual property (IP) blocks. In contrast to hard IP blocks (as mentioned above), soft IP blocks are defined through configuration of programmable logic elements and programmable routings, e.g., Look-Up-Table (LUT), registers, etc. The soft IP blocks can be varied in their design through varying their configuration information. It should be appreciated that control circuit 301, storage circuit 302 and comparator circuit 304 may operate similarly to control circuit 201, storage circuit 202 and comparator circuit 204 of FIG. 2, respectively. Therefore, the details of these components and their operation will not be described further, for the sake of brevity.

A user design may be divided into a static region, and one or more partial reconfiguration regions. A static region is an area on the integrated circuit device that may not be reconfigured without reprogramming the entire device. A partial reconfiguration region is an area that can be partially reconfigured independently (e.g., while the integrated circuit device is running or operating in user mode) to implement new logic. As shown in FIG. 3, integrated circuit device 300 may include a static region 306 and two partial reconfiguration groups 308A and 308B. For example, partial reconfiguration group 308A may include partial reconfiguration regions 310 and 312 and partial reconfiguration group 308B may include partial reconfiguration regions 314 and 316.

Partial reconfiguration region grouping may be useful whenever the user design is modified (e.g., by reconfiguring a partial reconfiguration region, etc.). For example, when multiple partial reconfiguration regions are defined in integrated circuit device 300, the partial reconfiguration regions may be grouped together using any suitable method. A group identifier may be generated and shared across multiple integrated circuit regions after the user design is compiled. In one embodiment, a separate group identifier is assigned to each partial reconfiguration group 308A and 308B, respectively. Additionally, a unique identifier may also be generated for each of the integrated circuit regions in each group. The group identifiers and the unique identifiers are additionally stored to storage circuit 302, during the configuration of static region 306 in integrated circuit device 300. It should be appreciated that storage circuit 302 may reside external to integrated circuit device 300 in a bigger system.

The group identifier is useful to determine compatibility during design modification. For example, when the design implementation of partial reconfiguration region 314 is changed or modified, a new group identifier is generated for partial reconfiguration group 308B, to which partial reconfiguration region 314 belongs. Additionally, a new unique identifier is generated for partial reconfiguration region 314. The new unique identifier replaces the unique identifier of partial reconfiguration region 314 from a previous design compilation. In this scenario, the unique identifier associated with partial reconfiguration region 316 that is obtained from the previous design compilation may not be updated as only partial reconfiguration region 314 has been changed in this example.

If there is no modification made to any of the partial reconfiguration regions (e.g., partial reconfiguration regions 310 and 312) in partial reconfiguration group 308A, the group identifier for that group remains the same. Subsequently, the modified user design is recompiled to generate new full configuration data of the modified user design, as well as new partial reconfiguration data for partial reconfiguration region 314. The new full configuration data and the new partial reconfiguration data will now contain the new group identifier and the new unique identifier.

Figure 4:
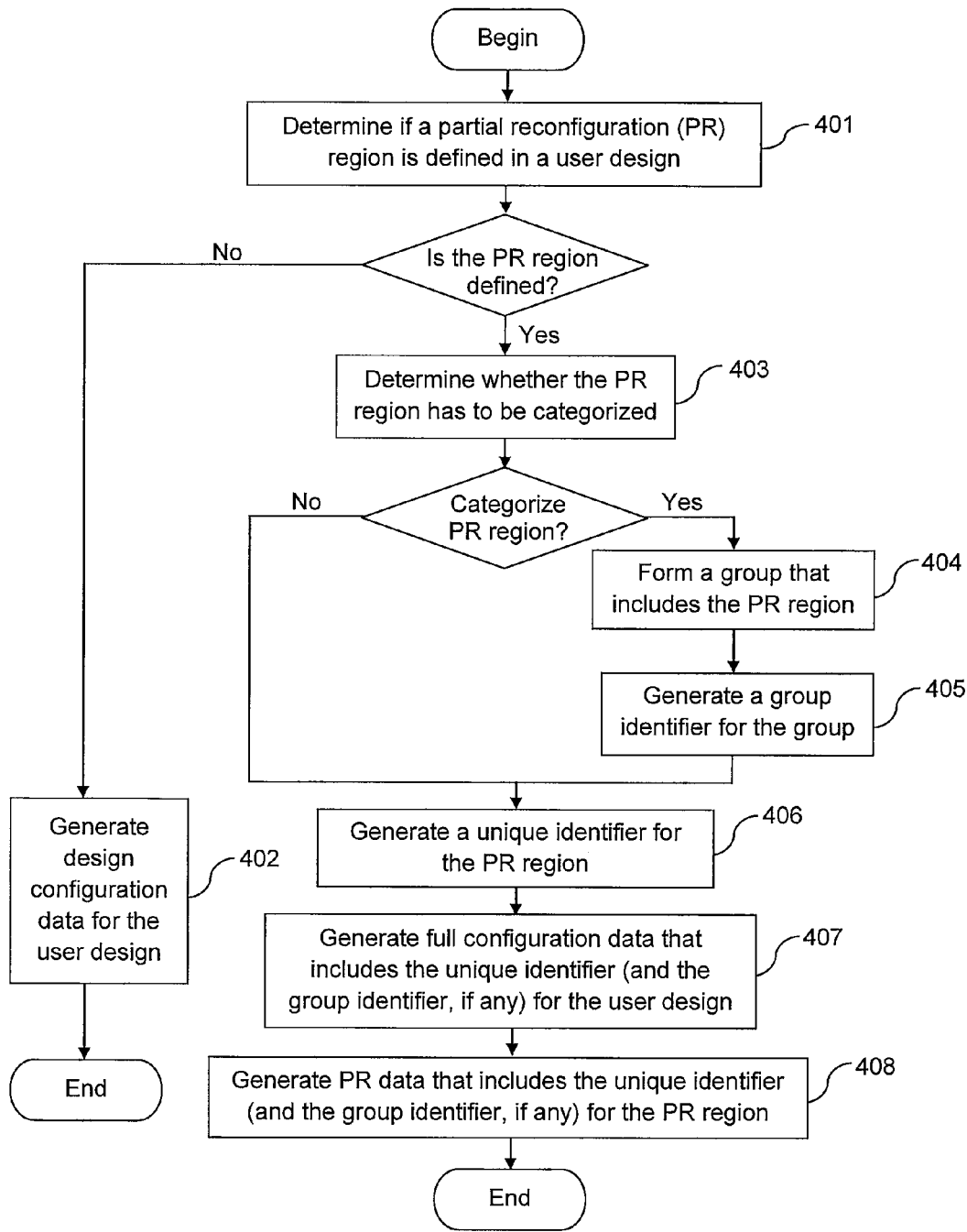
FIG. 4 shows illustrative steps for compiling a custom user design for an integrated circuit device in accordance with one embodiment of the present invention.

FIG. 4 shows illustrative steps for compiling a custom user design for an integrated circuit device in accordance with one embodiment of the present invention. In one embodiment, the steps shown in FIG. 4 may be performed by an electronic design automation (EDA) tool during compilation of a circuit or user design. At step 401, the EDA tool may determine if a partial reconfiguration region is defined in the user design. It should be appreciated that the user design may have one or more partial reconfiguration regions that may be reconfigured independently during normal operation of the integrated circuit device without affecting other parts of the device.

If a partial reconfiguration region is not defined in the user design, full configuration data without a partial reconfiguration region defined is generated for the user design at step 402. On the other hand, if a partial reconfiguration is defined in the user design, the defined partial reconfiguration region may be determined whether to be categorized or not at step 403.

In the case of multiple partial reconfiguration regions defined in a user design, at step 404, one or more partial reconfiguration regions may be grouped together, depending on the requirements of the user design. A group identifier is generated for the group at step 405. In one embodiment, the group identifier may identify a specific group of partial reconfiguration regions in the user design. The group identifier may be shared across multiple partial reconfiguration regions in the same group. For example, as shown in FIG. 3, partial reconfiguration regions 310 and 312 share the same group identifier since they are in the same group (e.g., partial reconfiguration group 308A0. Similarly, partial reconfiguration regions 314 and 316 share the same group identifier since they are in the same group (e.g., partial reconfiguration group 308B). The group identifier is useful to determine compatibility during design modification. For example, as shown in FIG. 3, when the implementation of partial reconfiguration region 314 is changed or modified, a new group identifier will only be generated for partial reconfiguration group 308B, to which partial reconfiguration region 314 belongs. While there is no modification made on any of the partial reconfiguration regions (e.g., partial reconfiguration regions 310 and 312) in partial reconfiguration group 308A, the group identifier for that group remains the same.

At step 406, a unique identifier is generated for the partial reconfiguration region. The unique identifier is used to identify a specific partial reconfiguration region, unlike the group identifier, which is used to identify the group to which the partial reconfiguration region belongs. The unique identifier may include a character string that may be any desired combination of letters, numbers, punctuation symbols and mathematical symbols, or represented by characters that are randomly generated by a computer. As an example, the unique identifier may be generated by a random number generator or any other suitable mechanism. Alternatively, the unique identifier may be generated by applying a hash algorithm to a value obtained from intermediate data associated with the partial reconfiguration region. In one embodiment, the unique identifier may be replaced by a new unique identifier whenever the design implementation of the partial reconfiguration region is changed or modified during design modification.

At step 407, full configuration data that includes the defined partial reconfiguration region is generated for the user design. In one embodiment, the full configuration data may include a table that contains one or more unique identifiers and their associated group identifiers.

At step 408, partial reconfiguration data that includes the unique identifier (and the group identifier, if any) for the partial reconfiguration region is generated. The partial reconfiguration data may be partial reconfiguration data that is used to reconfigure at least a portion of the integrated circuit device during user mode (e.g., during normal operation of the device). It should be noted that in one embodiment, whenever modifications are made to the user design, the modified user design may need to be recompiled and new partial reconfiguration data that includes the new unique identifier will be generated. The new unique identifier may differentiate the new partial reconfiguration data from the previous partial reconfiguration data.

Figure 5:
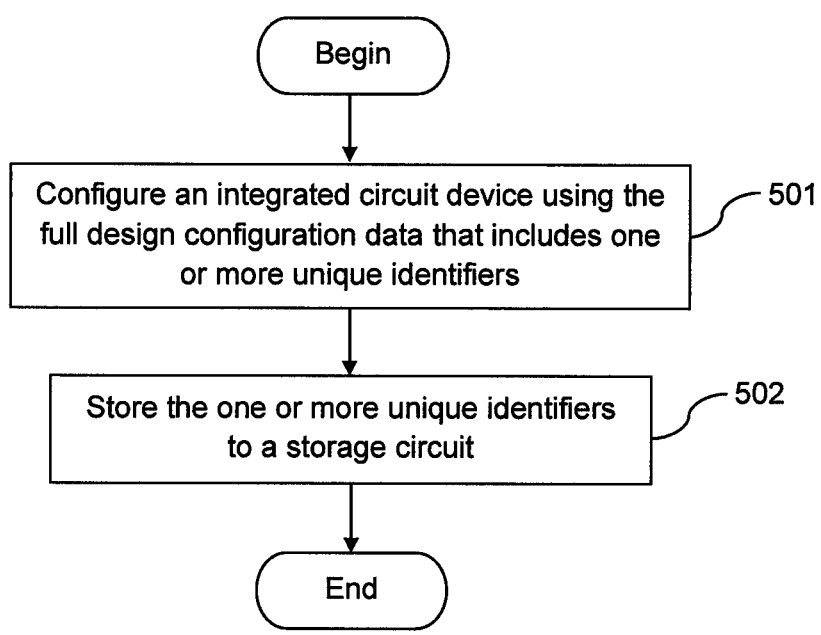
FIG. 5 shows illustrative steps for configuring an integrated circuit device in accordance with one embodiment of the present invention.

FIG. 5 shows illustrative steps for configuring an integrated circuit device in accordance with one embodiment of the present invention. In one embodiment, the steps shown in FIG. 5 may be performed by an electronic design automation (EDA) tool during configuration of the integrated circuit device (e.g., integrated circuit device 200 of FIG. 2 and integrated circuit device 300 of FIG. 3).

At step 501, an integrated circuit device is configured using the full configuration that is generated at step 407 of FIG. 4. As mentioned above, the full configuration data may include a table of data that contains one or more unique identifiers. In one embodiment, each of the unique identifier may identify a partial reconfiguration region of the integrated circuit device. The partial reconfiguration region, for example, may be a partial reconfiguration region, or a group of partial reconfiguration regions.

At step 502, the one or more unique identifiers from the full configuration data are retrieved and stored to a storage circuit in step 502. The storage circuit may be any type of storage structures or devices (either internal or external to the integrated circuit device) that provides the capability to store data. In one embodiment, the stored unique identifiers are used to perform a compatibility check during a device reconfiguration operation. A more detailed description of the device reconfiguration operation will be described below with reference to steps 601-604 of FIG. 6.

Figure 6:
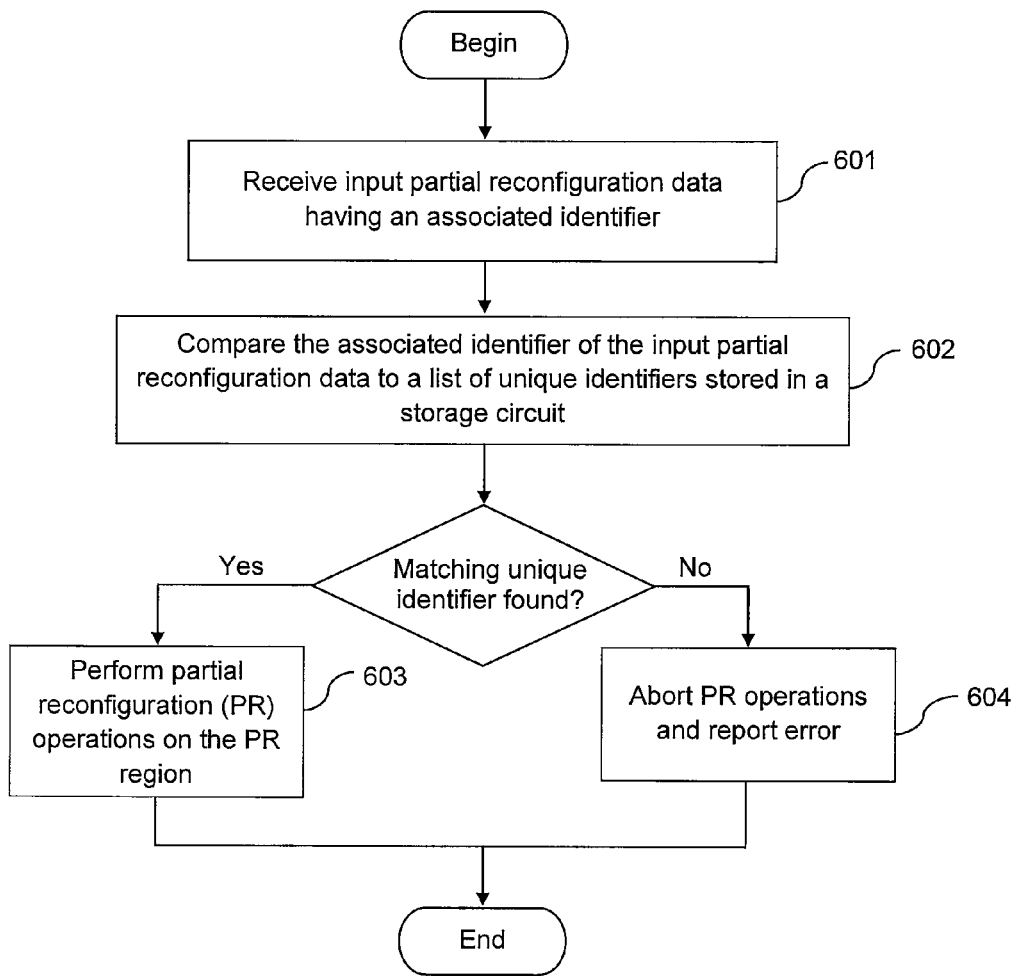
FIG. 6 shows illustrative steps for reconfiguring an integrated circuit device in accordance with one embodiment of the present invention.

FIG. 6 shows illustrative steps for reconfiguring an integrated circuit device in accordance with one embodiment of the present invention. In one embodiment, the integrated circuit device is initially configured at steps 501-502 of FIG. 5. During device reconfiguration, input partial reconfiguration data having an associated identifier is received by the integrated circuit device at step 601. As an example, the configuration data may be received by control circuits 201 and 301 of FIGS. 2 and 3, respectively. The input partial reconfiguration data may contain configuration information of a specific partial reconfiguration region that is generated at step 408 of FIG. 4. The associated identifier in the input partial reconfiguration data may be derived from a unique identifier belonging to the specific partial reconfiguration region during a design compilation (or recompilation) of the integrated circuit device, as illustrated in steps 401-408 of FIG. 4.

In order to determine whether the input partial reconfiguration data is compatible with the configured static region of the integrated circuit device, a compatibility check is performed on the input partial reconfiguration data by comparing the associated identifier of the input partial reconfiguration data to a list of unique identifiers stored in a storage circuit at step 602. In one embodiment, the compatibility check is performed using a comparator circuit (e.g., comparator circuit 204 of FIG. 2, comparator circuit 304 of FIG. 3) in the integrated circuit device. The comparator circuit may produce a comparator output that identifies compatibility between the received input partial reconfiguration data and the static region of the integrated circuit device. Such a compatibility check may prevent a user from reconfiguring the integrated circuit device using an incompatible input partial reconfiguration data (e.g., partial reconfiguration data with mismatched associated identifier from a previous compilation of the integrated circuit device design) and thus, may protect the integrated circuit device from potentially harmful reconfiguration.

When a matching identifier is found, partial reconfiguration operations are performed on the partial reconfiguration region of the integrated circuit device at step 603. Otherwise, the partial reconfiguration operations are aborted and an error is reported at step 604. As an example, the error may be reported to the user by displaying an error message on a display monitor or a similar output device. For example, the display monitor may be part of input and output devices 57 of FIG. 1B.

The method and apparatus described herein may be incorporated into any suitable circuit. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A method of using computer equipment to create a configuration for an integrated circuit device, the method comprising:

receiving custom logic design data for the integrated circuit device;

determining whether a partial reconfiguration region for the integrated circuit device is defined in the custom logic design data;

in response to determining that the partial reconfiguration region for the integrated circuit device is defined in the custom logic design data, assigning an identifier for the partial reconfiguration region; and in response to receiving partial reconfiguration data, determining whether the partial reconfiguration data is compatible with the partial reconfiguration region based at least on the identifier.

2. The method defined in claim 1, further comprising:

generating full configuration data for a static region of the integrated circuit device based on the custom logic design data, wherein the full configuration data includes the identifier.

3. The method defined in claim 2, wherein the partial reconfiguration data includes the identifier.

4. The method defined in claim 3, further comprising:

determining a change in the custom logic design data associated with the partial reconfiguration region.

5. The method defined in claim 4, further comprising:

assigning an additional identifier for the partial reconfiguration region in response to determining the change in the custom logic design data, wherein the additional identifier replaces the identifier, and wherein the additional identifier is different than the identifier.

6. The method defined in claim 5, further comprising:

generating an updated full configuration data for the integrated circuit device based on the change of the custom logic design data, wherein the full configuration data includes the additional identifier.

7. The method defined in claim 6, further comprising:

generating an updated partial reconfiguration data for the partial reconfiguration region, wherein the partial reconfiguration data includes the additional identifier.

8. A method of configuring an integrated circuit device comprising:

receiving input partial reconfiguration data that contains an associated identifier;

determining whether the input partial reconfiguration data is compatible with a partial reconfiguration region of the integrated circuit device based at least on the associated identifier;

in response to determining that the input partial reconfiguration data is compatible with the partial reconfiguration region, performing reconfiguration operations on the partial reconfiguration region; and in response to determining that the input partial reconfiguration data is incompatible with the partial reconfiguration region, aborting the reconfiguration operations and reporting an error.

9. The method defined in claim 8, further comprising:

prior to receiving the input partial reconfiguration data, receiving full configuration data for the integrated circuit device, wherein the full configuration data includes an unique identifier that identifies the partial reconfiguration region of the integrated circuit device.

10. The method defined in claim 9, further comprising:

storing the unique identifier in the integrated circuit device.

11. The method defined in claim 8, wherein determining whether the input partial reconfiguration data is compatible with the partial reconfiguration region comprises comparing the associated identifier of the input partial reconfiguration data to the stored unique identifier using a comparator circuit.

12. The method defined in claim 11, further comprising:

generating a comparator output using the comparator circuit when the associated unique identifier matches the unique identifier, wherein the comparator output identifies that the input partial reconfiguration data is compatible with the partial reconfiguration region of the integrated circuit.

13. The method defined in claim 12, wherein performing the partial reconfiguration operations further comprises perform partial reconfiguration operations based on the comparator output.

14. The method defined in claim 11, wherein comparing the associated identifier of the input partial reconfiguration data to the unique identifier comprises generating a signal to indicate that the input partial reconfiguration data is incompatible with the partial reconfiguration region when a mismatch is found between the associated identifier and the unique identifier.

15. An integrated circuit comprising:

a storage circuit that stores a unique identifier, wherein the unique identifier identifies a partial reconfiguration region of the integrated circuit;

a control circuit configured to receive input partial reconfiguration data for the partial reconfiguration region of the integrated circuit; and a comparator circuit that determines whether the input partial reconfiguration data is compatible with the partial reconfiguration region of the integrated circuit based on the unique identifier.

16. The integrated circuit defined in claim 15, wherein the input partial reconfiguration data comprises an associated identifier that is derived from the unique identifier during a design compilation operation of the integrated circuit.

17. The integrated circuit defined in claim 16, wherein the comparator circuit compares the associated identifier with the unique identifier to determine whether the associated identifier matches the unique identifier.

18. The integrated circuit defined in claim 17, wherein the comparator circuit produces a comparator output when the associated unique identifier matches the unique identifier, wherein the comparator output identifies that the input partial reconfiguration data is compatible with the partial reconfiguration region of the integrated circuit.

19. The integrated circuit defined in claim 15, wherein the storage circuit is a register.

20. The integrated circuit defined in claim 15, wherein the partial reconfiguration region comprises a plurality of partial reconfiguration regions.

* * * * *